May 11, 1937.  R. CHILTON  2,079,681
TRANSMISSION
Filed Sept. 17, 1935  6 Sheets-Sheet 1
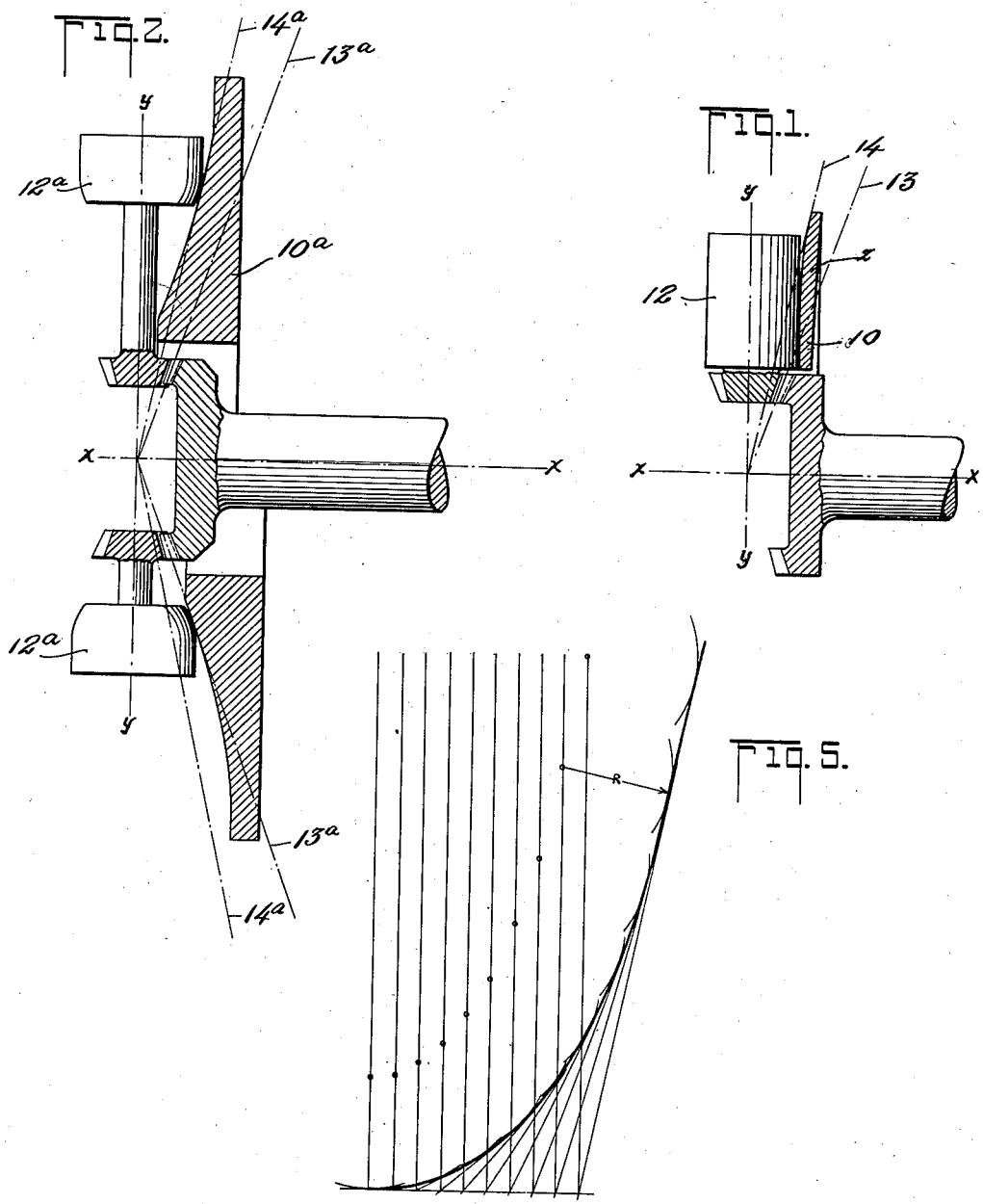
INVENTOR.
ROLAND CHILTON
BY
ATTORNEY.

May 11, 1937.  R. CHILTON  2,079,681
TRANSMISSION
Filed Sept. 17, 1935   6 Sheets-Sheet 2

INVENTOR.
ROLAND CHILTON
BY
ATTORNEY.

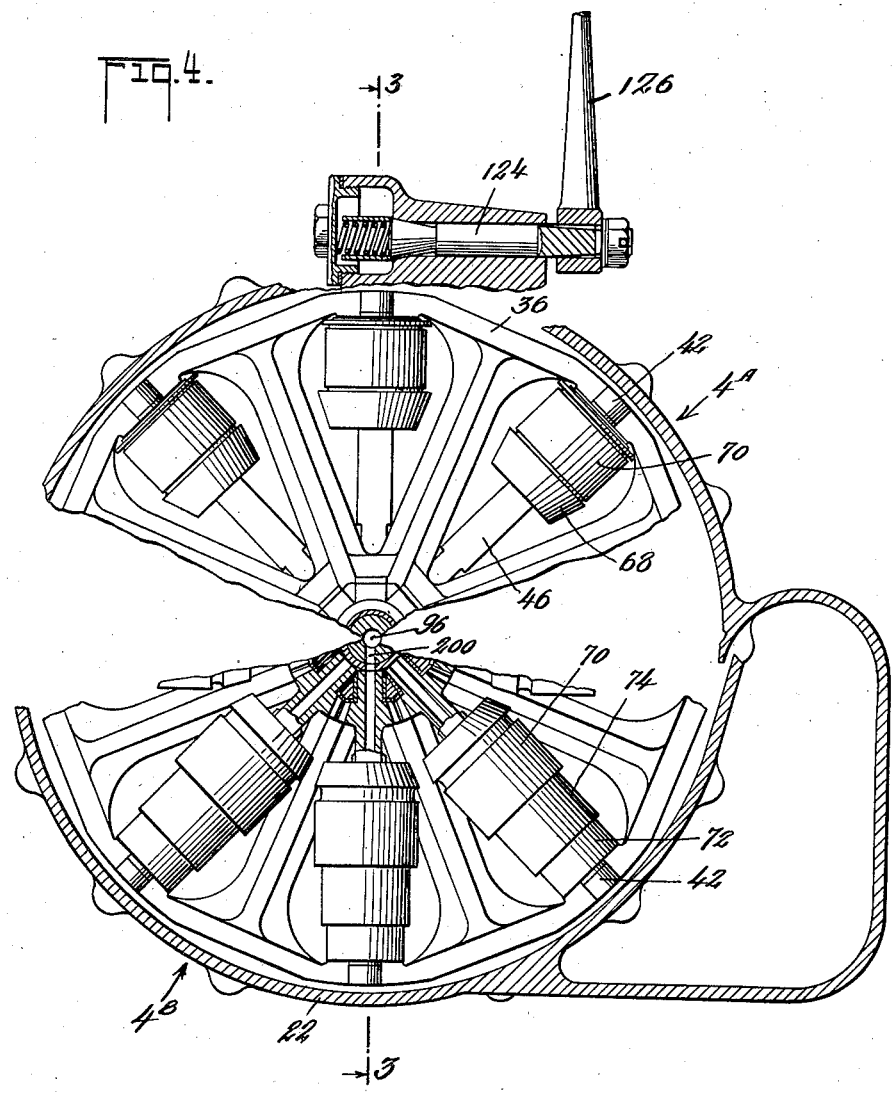

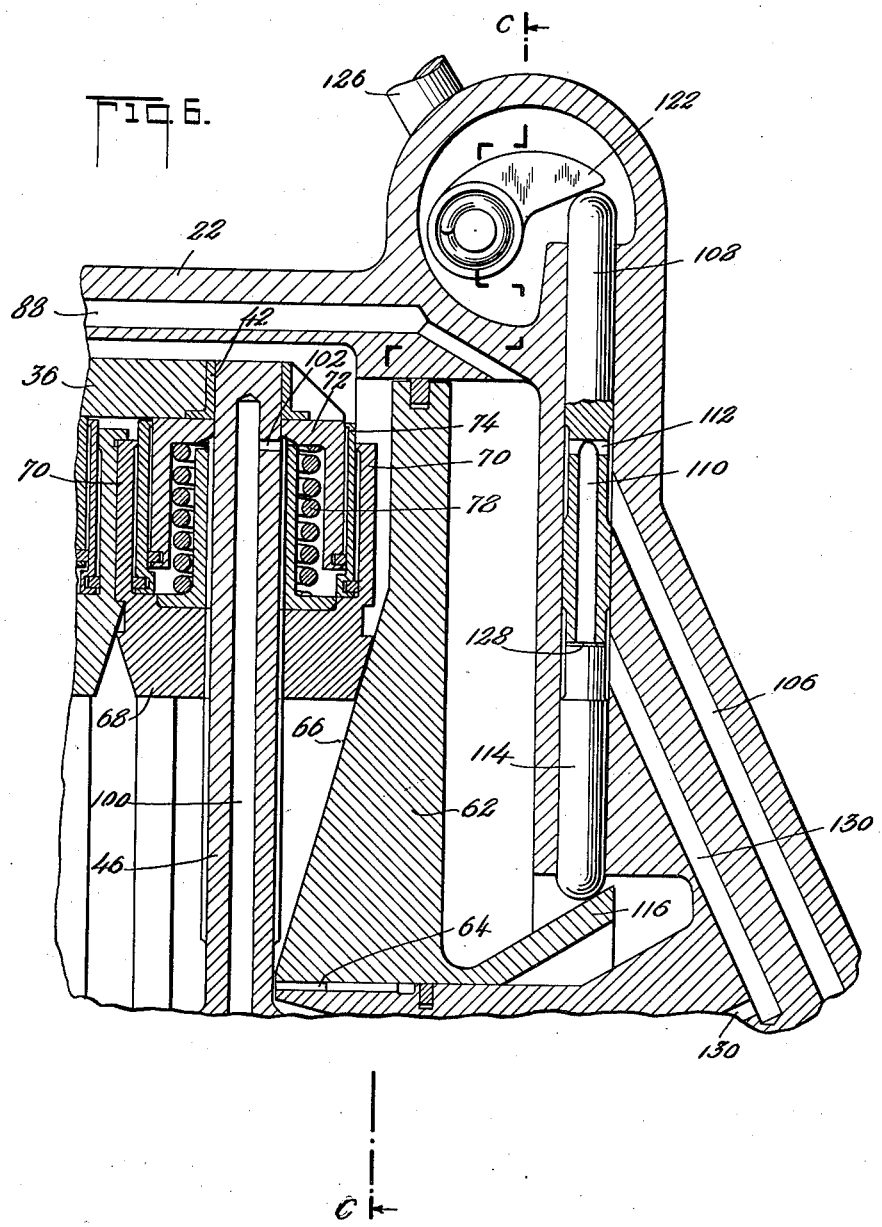

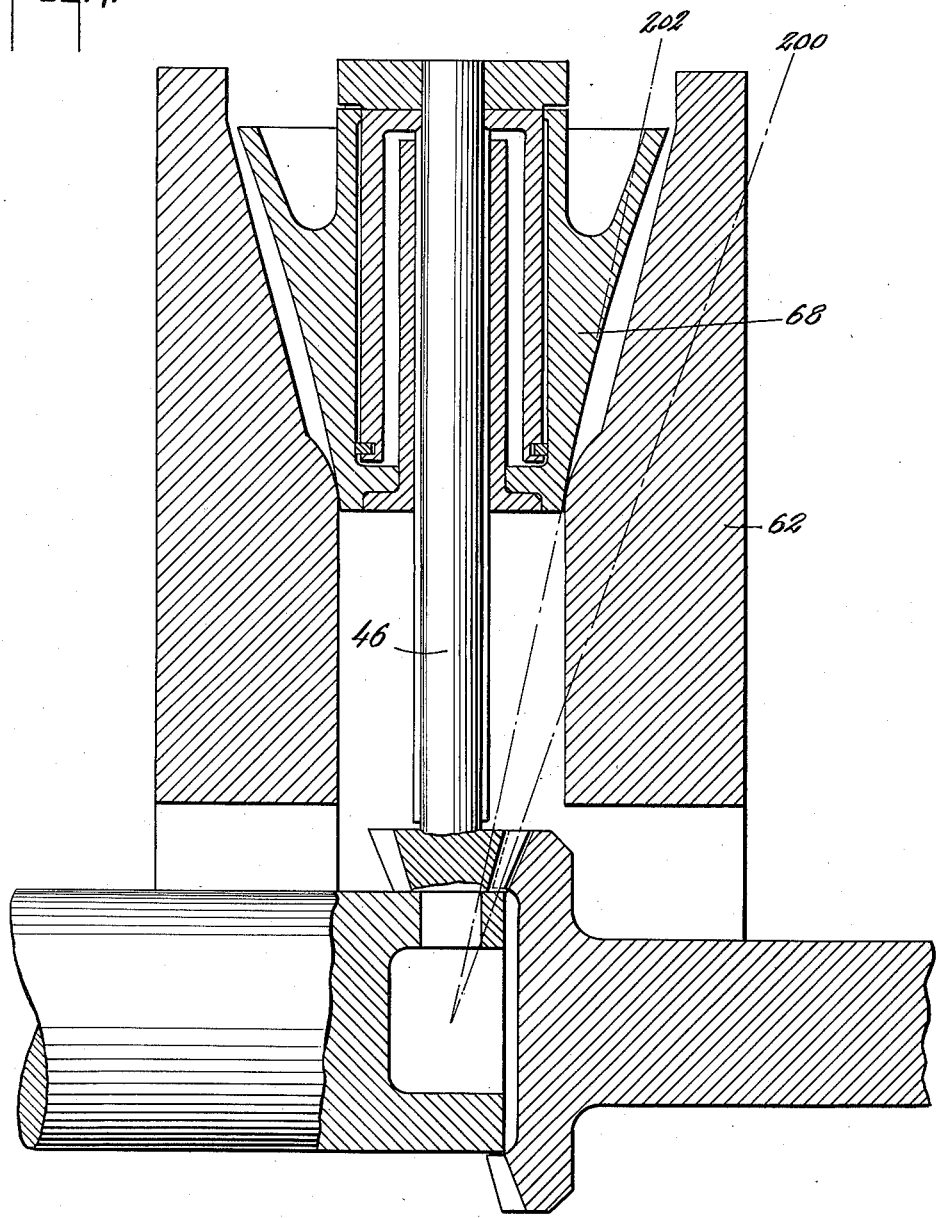

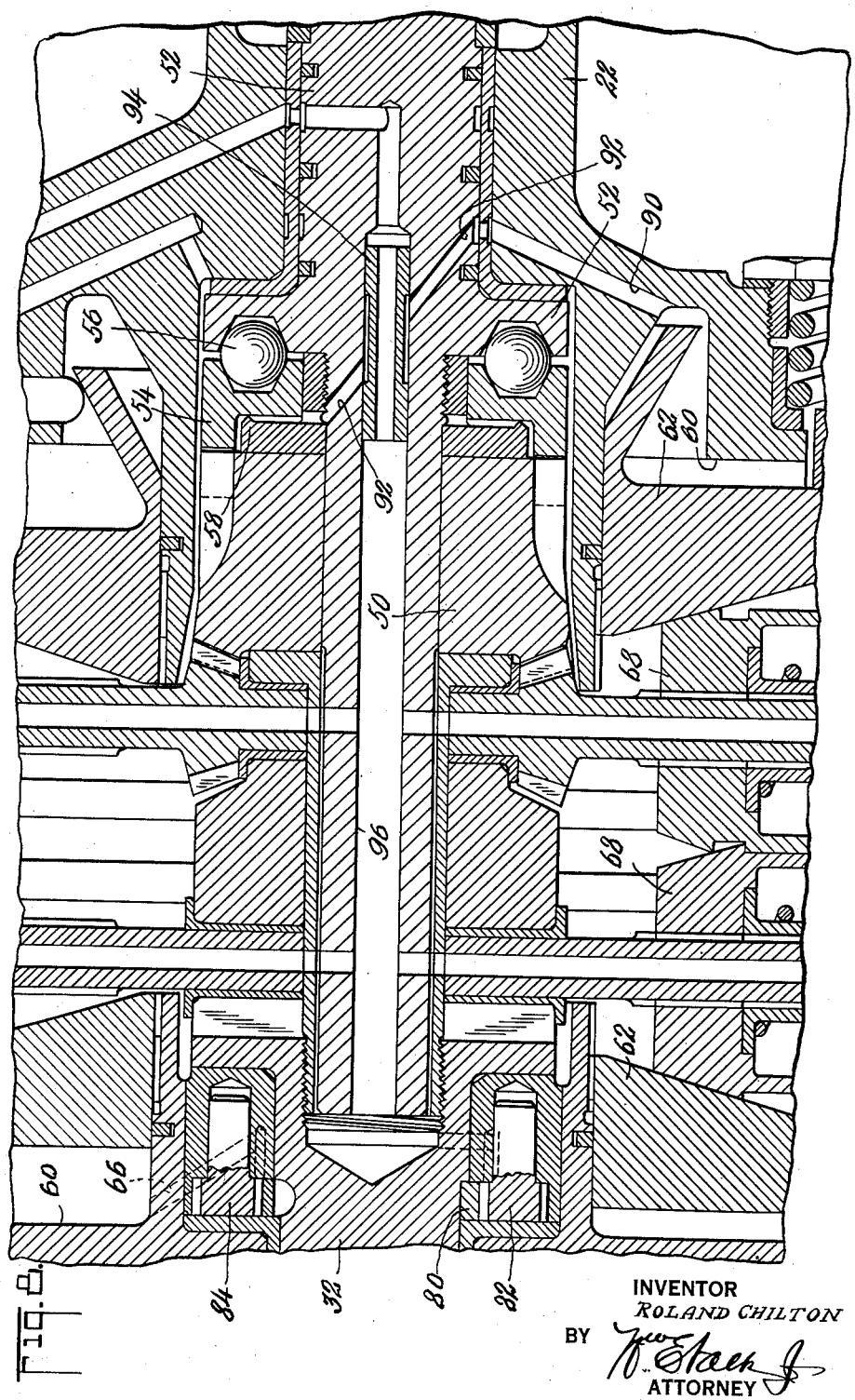

Patented May 11, 1937

2,079,681

UNITED STATES PATENT OFFICE 2,079,681

TRANSMISSION

Roland Chilton, Ridgewood, N. J.

Application September 17, 1935, Serial No. 40,919

12 Claims. (Cl. 74—281)

This invention relates to the type of transmission wherein driving members are moved to subtend different pitch cone angles of driving contact. An essential feature of the invention resides in providing a novel profile for the members whereby the surfaces at all contact points lie along the local pitch cone angle.

The invention comprises a continuing development in my series of copending applications Serial Numbers 669,144, filed May 3, 1933; 728,058, filed May 29, 1934; 742,751, filed September 7, 1934; 742,752, filed September 7, 1934; 743,515, filed September 11, 1934; 746,958, filed October 5, 1934; 759,349, filed December 27, 1934; 25,065, filed June 5, 1935; 25,066, filed June 5, 1935, and 40,920, filed concurrently herewith.

In these dispositions a substantially cylindrical roller is rockably contacted by a crown-faced disk, for contact shift over a range of pitch cone angles, and reference to the diagram of Fig. 1 will show that the contacting surfaces make an angle to the associated pitch cone line which results in a certain degree of slipping or spinning action. As the contact loads between the crowned faces are increased, the elastic distortion of the material increases the area, and therefore the length of the contact and the degree of sliding also increases with the length of the contact and with the angle by which the plane of contact departs from the theoretically correct pitch cone line, which of course passes through the axial intersection point of the members.

For high capacity long contacts are desired, but they detract from the efficiency of the transmission where this angular error is present. Accordingly, the present invention utilizes curved members which are moved axially to vary the pitch cone angle subtended by their contacts, the curvature being at all contact positions tangent to the line through the common axis point and the contact point.

Other objects of this invention are to provide means for controlling the movement of the members and to maintain the contact loads thereon proportional to the instantaneous driving effort regardless of the varying effects of centrifugal force, contact position, etc.

Further objects of the invention will be obvious from, or will be pointed out in the following description with reference to the drawings, in which:

Fig. 1 is a diagram illustrating a conventional arrangement;

Fig. 2 is a diagram illustrating one of the novel dispositions of the invention;

Figure 3:
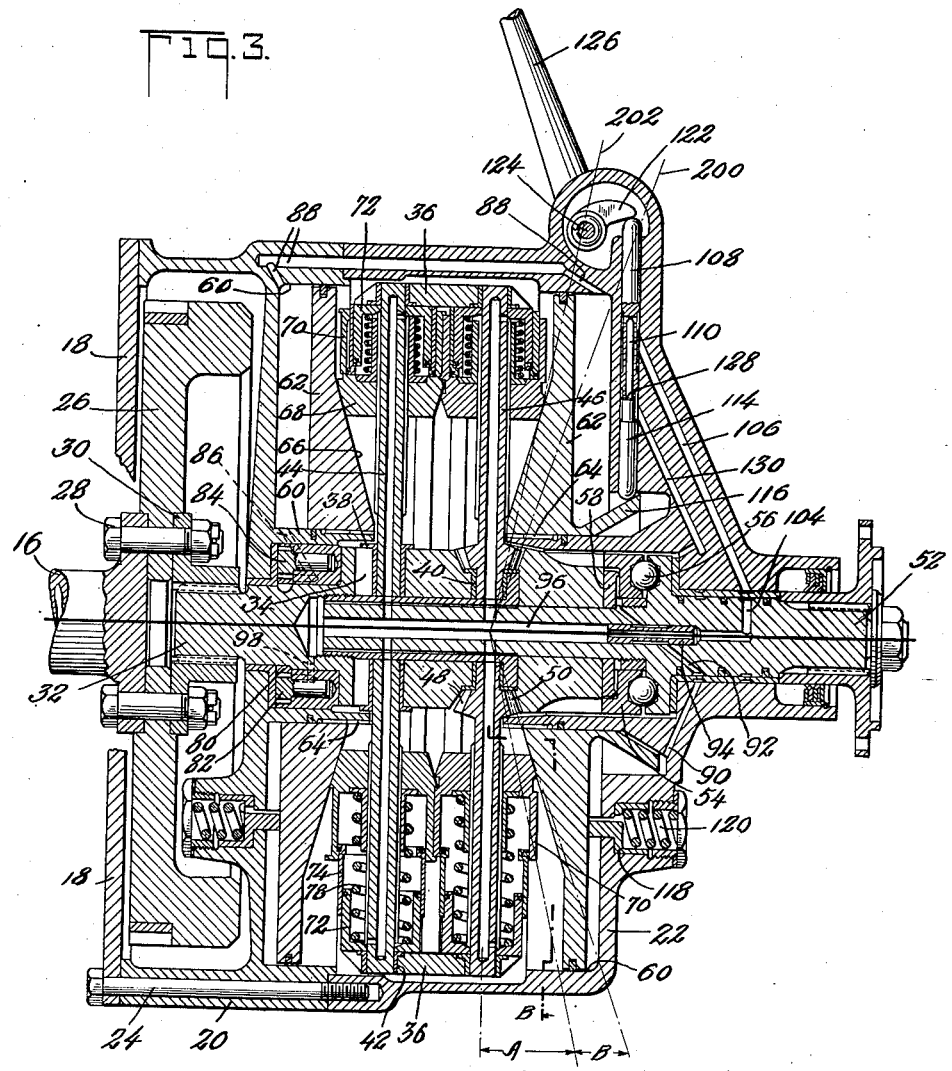
Fig. 3 is a longitudinal axial section through a complete embodiment along the line 3—3 of Fig. 4.

Fig. 4 comprises fragmentary cross sections in which 4A is a section along the line CC of Fig. 6, and in which 4B is a part section on the line BB of Fig. 3;

Fig. 5 is a diagram showing the geometry of the curve of the disc profile;

Fig. 6 is an enlarged view of part of Fig. 3;

Fig. 7 is an enlarged diagram of an alternative embodiment, and

Fig. 8 is an enlarged view of the central portion of the showing of Fig. 3.

Referring first to the diagrams of Figs. 1 and 2; 10 and 10a represent discs having axes $x$—$x$, while 12 and 12a represent rollers having axes $y$—$y$ intersecting the disc axes $x$—$x$. In each case the contact is shiftable from the large pitch cone angle of the lines 13, 13a to the smaller pitch cone contact angle 14, 14a.

In case of Fig. 1, the contact shift is obtained by distorting or rocking the disc 10, while in the embodiment of Fig. 2, the disc and roller are both moved axially, the upper part of Fig. 2 showing the position for the outer or small pitch cone angle of contact and the lower half showing the position for the inner or large pitch cone angle of contact. It will be seen that the disc is so profiled that its surface is tangent to the pitch cone line at the associated contact point. Thus the disc and roller contacts may be said to comprise elements of bevel "gears" of the appropriate face angle to give true rolling action without any sliding component even though relatively great length of contact be utilized.

In the conventional arrangement of Fig. 1 there is an error, indicated by the angle Z, from the required slope for true rolling contact. The driving ratio varies as the contact is shifted and it may be said that, with a wide contact, the transmission is "in two different speeds at the same time" which obviously involves some slippage which is avoided in the novel disposition of Fig. 2. In this specific diagram a narrow roller has been shown as contacted with a relatively wide disc but alternately a long roller of appropriate profile may be contacted with a convex ring face and the same mode of operation obtained (see Fig. 7). It will also be seen that if the disc 10a be formed as a straight cone having an angle intermediate between the large and small pitch cones, the departure from the theoretically correct angle will be quite small compared to the conventional case of Fig. 1, and this simplified shape has been illustrated in the complete embodiment of Fig. 3.

In Fig. 3, 16 designates a conventional shaft of an engine having a back plate 18 to which transmission housings 20 and 22 are secured by studs 24. A conventional fly wheel 26 is secured to the shaft 16 by bolts 28 which also secure a driving flange 30 into which is splined a driving shaft 32 provided at its right hand end with driving dogs 34 mated with suitable slots in a cage 36. The cage slots are deep enough to accommodate bushings 38 and further slots are provided at the right hand side of the cage to receive bushings 40, while outer bushings 42 are similarly supported in the rim of the cage.

Splined shafts 44, 46 are supported in these bushings, the latter shaft having a bevel pinion 48 meshed with a bevel gear 50 which drives a driven shaft 52 by means of a driving member 54 and balls 56 which are engaged in inclined pockets in the member 54 and shaft 52 as shown. The member 54 is held to very slight axial movement by a valve seat member 58 which is screwed upon the shaft.

The housings 20, 22 are provided with annular cylinders 60 in which are slidably mounted discs 62 which comprise hydraulic pistons and form the fixed or reaction members of the transmission, being splined to the housings at 64, the opposing faces 66 of the discs 62 being of substantially conical form, the cone angle being intermediate between the maximum and minimum pitch cone angles subtended by the contact shift.

Engaged with the conical working faces of the discs and slidable on the splined shafts 44, 46 are conical rollers 68 having cylindrical extensions 70 whereby the rollers are in paired contact and which form hydraulic cylinders cooperating with piston elements 72 which at all times abut the cage 36. (See also enlarged view in Fig. 7). For compactness, telescoping sleeves 74 are interposed between the extensions 70 and the piston elements 72. Springs 78 are provided whereby the rollers are urged towards their inner position shown in the bottom half of Fig. 3.

A gear 80 (Fig. 3) is secured to the driving shaft 32 and meshes with pinions to comprise pumps 82 and 84. One of these pumps 84 is connected to the left hand cylinder 60 as indicated at 86 and through holes 88 to the right hand cylinder 60. Also, this hydraulic system communicates, through a hole 90 in the rear housing 22, and by a hole 92 in the driven shaft 52 with the valve seat member 58. A waisted sleeve 94 is inserted in the bore 96 of the shaft 52 to separate this hydraulic system from that bore.

A second hydraulic system is comprised by the pump 82 communicating, by a hole 98 in the driving shaft 32, with the bore 96 of the driven shaft 52 and thence, by holes 100, 102 in the shafts 44, 46 to the hydraulic pistons and cylinders 72, 70 of the rollers. The bore 96 also communicates through the sleeve 94 to a hole 104 in the shaft 52 and thence through a hole 106 to a control valve 108 which is provided with an axial hole 110 and a cross hole 112. (See also Fig. 6). At its lower end the control valve 108 cooperates with a plunger 114 engaging a conical extension 116 of the disc 62.

Stop plungers 118 loaded by springs 120 are arranged to be engaged by the discs 62 when these reach the zero ratio position in which they are shown in the lower half of Fig. 3.

The control valve 108 is operated by a short lever 122 on a control shaft 124 provided with a control lever 126.

The operation of the device is as follows:

The hydraulic pressure developed by the pump 82 is at all times acting on the rollers 68, but under the control of the valve 108 as follows: There is at all times a slight opening at 128 between the valve 108 and the plunger 114 and through this opening the entire quantity of oil pumped by the pump 82 escapes by way of a vent hole 130. Suppose now that the rollers 68 should attempt to move outwardly from the position set by the valve 108, then the right hand disc 62 must follow the roller movement by moving to the left and the coned extension 116 will immediately lift the plunger 114, reducing the pressure relief opening at 128 thus promptly increasing the hydraulic pressure on the rollers and preventing incipient movement. Alternately, suppose that the control plunger 108 is moved downwards, closing off the relief outlet at 128, then full hydraulic pressure from the pump 82 will devolve upon the rollers which would be forced inwards for just so far as the resulting downward motion of the plunger 114 is followed up by the control valve 108 and the rollers will be held stationary in their new positions immediately the follow-up motion of the control valve 108 is stopped.

The reaction discs 62 are contact-loaded against the rollers 68 by the pump 84 which is connected to both these discs and to the torque-responsively loaded relief valve 58 as previously described. It has already been seen that the balls 56 press the member 54 towards the seat 58 with a pressure that is at all times proportional to the instantaneous torque on the driven shaft 52. Thus, the contact load of the discs 62 against the rollers 68 is always maintained in proportion to the driven shaft torque.

It is a characteristic of transmissions having a fixed reaction member and reversed direction of rotation between the driving and driven shafts, that the torque reaction on the fixed member is the sum of the driving and driven shaft torques. From this it follows that the reaction torque increases, in relation to the driven torque, as the driving ratio is increased from zero ratio to 1:1. In this disposition the radius of the roller contact on the discs 62 increases in like proportion.

It will be seen that the hydraulic contact loads on the reaction discs 62 vary proportionally to the driven torque regardless of the ratio position of the rollers and that this ratio position is determined by the position of the valve 108 independently of the amount of hydraulic pressure required to move the rollers and maintain them in the position dictated by the control valve. The pressure required will vary with the torque-responsive pressure on the reaction discs 62 and with the speed of rotation of the cage 36 since this rotation generates centrifugal force. However, the amount of hydraulic pressure required at the rollers 68 is of incidental importance since the rollers will always move to that position where the slight opening under the relief valve at 128 has the area required to pass the entire oil quantity delivered by the pump 82 at the existing pressure whatever that may be. Since the plunger 114 moves proportionately to the rollers 68 there is thus provided a sensitive pressure-indifferent control for the position of the rollers combined with a torque-responsive but position-indifferent contact load control.

The ratio changing function of this organization is similar to that which has been reiterated in my previously identified copending applications, as follows:

The pitch cone angles of the bevel gears 48 is indicated by the lines 200 and when the roller and disc contacts fall upon this pitch cone angle, as in the position shown in the lower half of Fig. 3, the driven bevel gear 50 must have the same state of rotation as the reaction discs 62 and since these are rotationally fixed the driven shaft 52 is held from rotation regardless of the speed of the cage 36 with the driving shaft 32. In other words, the transmission is in 1:0 ratio.

As the rollers are moved outwardly the pitch cone angle subtended by the contacts is reduced until in the position shown in the upper half of Fig. 3 the contacts subtend the angle indicated by the line 202. In this position the ratio of speed between driving shaft 32 and the driven shaft 52 is that between the dimensions A and B of the respective pitch cone lines, the driven shaft turning in the opposite direction to the driving shaft. Inward movement of the rollers beyond the 1:0 position shown in the lower part of Fig. 3 will give the opposite rotation to the driven shaft whereby both forward and reverse ratios are provided.

The function of the springs 78 is to lightly urge the rollers towards the zero ratio position of the lower part of Fig. 3 whereat the reaction discs 62 contact the spring-loaded stops 118, thus maintaining the parts in the 1:0 ratio position whereto they will be normally brought before the power source, which drives the driving shaft, is stopped. Such stoppage will cause the hydraulic pressures to fall to zero and the springs merely prevent the rollers from moving from zero ratio position when the transmission is standing by.

It will be understood that there is a balance of hydraulic pressure (at all times the transmission is operating) between the roller operating pistons and the reaction discs 62 whereby these members are maintained in the desired ratio position and contacted with the desired load. As long as this contact is maintained it is obvious that the conical formation of the disc faces 66 will constrain all the rollers to identical radius from the main axis of the transmission.

Moreover, it will be noted that the rollers are subject to heavy forces tending to move them outwardly both by centrifugal force and by the reactions of the contact pressures on their conical working surfaces. These pressures are hydraulically resisted and the roller pistons 72 comprise frictionless hydraulic thrust bearings which carry these loads. To avoid possible wear at the packing rings of the telescopic sleeve 74 it may be desirable to permit the piston 72 to rotate with the rollers and shafts 44—46 in which case the thrust bearing action will be transferred to the flat contact bases between the piston 72 and the cage 36. These faces, it should be further noted, act as a hydraulic seal for the pressure within the pistons from which they are lubricated and by which they are hydraulically floated with pressure proportional to the load. The provision of a sensitive and simple control for accurately locating the radial position of a plurality of rollers subject to heavy contact and centrifugal loads and the provision of frictionless thrust bearings to look after these loads represent the solution of several problems in accordance with the objects and advantages of this invention.

The geometrical development of the profile curve of the disc is illustrated in Fig. 5 wherein the curvature of the contacting part of the roller is indicated by R. A mathematical expression for this curve has been derived, but being somewhat complicated in form, it is thought best to omit it from this description.

In Fig. 7, there is illustrated, more or less diagrammatically, an alternate embodiment wherein the roller is profiled so that the contact shift is along the roller instead of across the disc as in the showings of the complete embodiment. In said Fig. 7, similar reference characters, where appropriate have been indicated on the drawings, wherefor a further and detail description is believed to be unnecessary.

The bevel gear 50 comprises the driven gear of the transmission and drives the driven shaft 52 by means of the driving member 54, which is end splined to gear 50 for unitary rotation therewith, and by way of the balls 56 which are engaged in inclined pockets in the member 54 and in the shaft 52 as shown. The member 54 is held to slight axial movement by the valve seat member 58 which is screwed rigidly upon the shaft.

The gear 80 is secured to the driving shaft 32 and meshes with pinions to comprise pumps 82, 84. One of these pumps 84 is connected to the left hand cylinder 60 as indicated at 66 and through holes 88 (Fig. 3) to the right hand cylinder. Also, this hydraulic system communicates through the hole 90 (see Fig. 8) in the rear housing 22 and by the diagonal hole 92 in the driven shaft 52 with the valve seat member 58. A waisted sleeve 94 is inserted in the bore 96 of the shaft 52 to separate this hydraulic system from that bore.

Since the balls 56 in cooperation with their inclined pockets form the sole driving connection between the driving member 54 and the driven shaft 52, these balls press the member 54 towards the seat 58 with a pressure that is at all times proportional to the instantaneous torque on the driven shaft 52. Thus, the contact load of the discs 62 against the rollers 68 is always maintained in proportion to the driven shaft torque. The pump 82 is at all times in communication with the cylinders 60 in which the discs 62 comprise pistons, and also with the relief valve 58 through the passages previously described. Thus, the only escape for the oil continuously delivered by the pump 84 is past the valve seat 58 and accordingly the hydraulic pressure will build up beneath this valve seat and act on the driving member 54 until the hydraulic pressure thereon balances the axial reaction from the balls 56, whereupon the member 54 will move very slightly to the right, thus establishing a slight opening of the valve seat 58 which prevents further rise in pump pressure. The entire quantity of oil delivered by the pump 84 is at all times escaping at this valve seat, which thus comprises, with the member 54, a torque-responsively loaded relief valve. The rate of flow from the valve will be momentarily increased or decreased when oil is also flowing out of or into the cylinders 60 to move the piston discs 62.

What is claimed is:

1. A transmission including, in combination, mutually contacting disc and roller members movable along intersecting axes to vary the transmission ratio, hydraulic pistons associated with the respective members, hydraulic systems serving respective pistons, a control valve for one system, and a seat for said valve subject to movement by a member of the other system.

2. In a transmission, in combination, contacting members to be moved along intersecting axes, hydraulic moving means for each member including a pump and a piston, a control means comprising a valve effective on one system, and a seat for said valve moved by a member of the other system.

3. In a transmission, in combination, mutually contacting disc and roller members movable along intersecting axes, a torque-responsively regulated hydraulic system associated with one member, and a manually regulated hydraulic system associated with the other member.

4. In a transmission, in combination, a first and a second member to be relatively moved and contact loaded, hydraulic systems associated with respective members, and a control valve means in the first said system subject to movement of the second member.

5. In a transmission, in combination, a first and a second member to be moved under contact load, hydraulic systems associated with respective members, control means in the first said system responsive to torque variations, and control means in the second said system subject to movement of the first said member.

6. The combination with a rotatable cage of roller members radially slidable therein, a disc member contacting said rollers, pistons associated with respective members, hydraulic systems associated with respective pistons, and a control valve in the roller system subject to movement from the disc member.

7. In a transmission, in combination, a rotatable cage, a plurality of rollers radially slidable in said cage, and means comprising piston and cylinder elements carried by said cage and associated with said rollers.

8. In a transmission, in combination, a rotatable cage, a plurality of rollers radially slidable in said cage, means within said cage comprising piston and cylinder elements associated with said rollers, and a telescopic sleeve between said pistons and cylinders.

9. In a transmission, in combination, a cage member, splined shafts radially mounted in said cage, bevel pinions on certain of said shafts, rollers slidable on said splines, and hydraulic means carried by said cage to control said sliding.

10. In a transmission, in combination, opposed disc members comprising axially movable pistons, roller members comprising pistons having conical contact with said disc and movable radially thereof, and means to effect said movements including hydraulic systems associated with respective members.

11. In a transmission, in combination, mutually contacting discs and radially movable planet rollers each comprising hydraulic pistons, a torque-responsive hydraulic pressure control means for the discs, and a movement-responsive hydraulic control means for the rollers.

12. In a transmission, in combination, opposed coaxial discs movable along the axis, rollers contacting and movable radially of the discs, means to apply hydraulic pressure to said discs proportional to the instantaneous transmitted torque and independently of the instantaneous disc position, and hydraulic means to position the rollers independently of the transmitted torque.

ROLAND CHILTON.